US007158013B2

(12) United States Patent
Schwager et al.

(10) Patent No.: US 7,158,013 B2
(45) Date of Patent: Jan. 2, 2007

(54) DETECTION OF BROADCAST SIGNALS FOR DEFINING USEABLE FREQUENCY BANDS FOR POWERLINE COMMUNICATION

(75) Inventors: Andreas Schwager, Fellbach (DE); Peter Buchner, Kirchheim/Teck (DE); Markus Zumkeller, Schwaikheim (DE); Lothar Stadelmeier, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 109 days.

(21) Appl. No.: 10/890,606

(22) Filed: Jul. 14, 2004

(65) Prior Publication Data

US 2005/0035850 A1 Feb. 17, 2005

(30) Foreign Application Priority Data

Jul. 16, 2003 (EP) .................................. 03016151

(51) Int. Cl.
*G08B 11/01* (2006.01)
(52) U.S. Cl. .......................... 340/310.01; 340/870.02; 455/3.3
(58) Field of Classification Search ........... 340/310.01, 340/310.03, 310.06, 870.02, 870.18; 455/3.3
See application file for complete search history.

(56) References Cited

U.S. PATENT DOCUMENTS 4,479,215 A * 10/1984 Baker .......................... 714/749
4,755,792 A * 7/1988 Pezzolo et al. ............. 340/538
5,066,939 A * 11/1991 Mansfield, Jr. ............. 455/402
5,245,633 A 9/1993 Schwartz et al.
5,404,127 A * 4/1995 Lee et al. .................... 375/261
6,737,984 B1 * 5/2004 Welles et al. ........... 340/870.02

* cited by examiner

*Primary Examiner*—Daryl C Pope
(74) *Attorney, Agent, or Firm*—Oblon, Spivak, McClelland, Maier & Neustadt, P.C.

(57) ABSTRACT

The present invention refers to a method for defining useable frequency bands for a powerline communication (PLC) system (101) using power supply lines of a power supply network (104a) for interconnecting a number of PLC nodes (302, 306) such that electromagnetic emissions generated by PLC signals (s(t)) transmitted via said power supply lines do not interfere with broadcast RF signals radiated in the same frequency bands. Before starting own communication activities, PLC nodes (302, 306) participating in a PLC session scan (S1*a*) the entire frequency range designated for powerline communication to detect (S1*b*) frequency bands which are occupied by broadcast services. During powerline communication the occurrence of broadcast signals is regularly checked (S2) by screening (S2*a*) the entire frequency range designated for powerline communication and detecting (S2*b*) relevant broadcast bands that should be omitted during powerline communication to avoid interference noise (n(t)). After that, new frequency bands for powerline communication are allocated (S3) within said frequency range, provided that these new bands are not occupied by any detected wireless service.

14 Claims, 6 Drawing Sheets

Fig. 2b

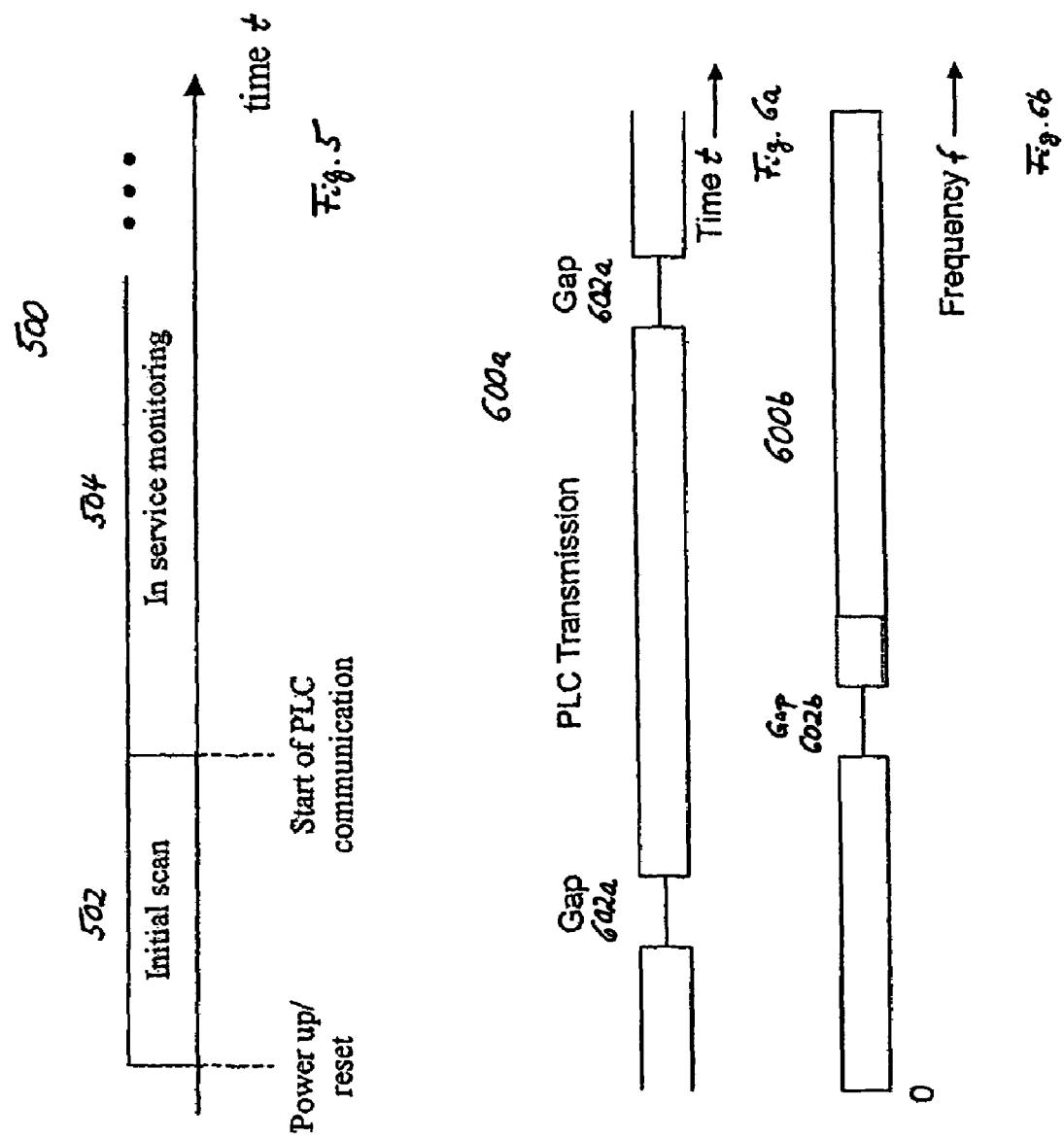

DETECTION OF BROADCAST SIGNALS FOR DEFINING USEABLE FREQUENCY BANDS FOR POWERLINE COMMUNICATION

FIELD AND BACKGROUND OF THE INVENTION

The present invention generally relates to the field of powerline communication (PLC) systems. It particularly refers to a method for defining useable frequency bands for a PLC system using AC or DC (car appliances etc.) power supply lines of a power supply network interconnecting a number of PLC nodes such that electromagnetic emissions generated by PLC signals transmitted via said power supply lines do not interfere with broadcast RF signals radiated in the same frequency bands.

According to the PLC technology power supply lines are used as a transmission channel for data (cf. FIG. 1). Powerline communications offers end users a broad spectrum of applications and services, which inter alia includes broadband Internet access, voice-over-IP (VoIP), multimedia services, home automation and energy management.

The traditional arena for powerline solutions is home automation, which encompasses applications where simple on/off or state change functionality is the primary role of powerline devices. Traditional wireless home-networking systems as depicted in FIG. 2a are typically deployed in the scope of line-of-sight, infrared, unidirectional, hand-held controller applications, e.g. for remotely controlling video cassette recorders, home security or alarm systems. An example for the last-meter network conditioning of such a powerline communication network is shown in FIG. 2b.

However, as traditional power supply networks are not designed for communication purposes, a PLC channel typically exhibits unfavorable transmission properties—a frequency-selective transfer function, attenuation increasing with frequency, severe narrowband interference and impulsive noise.

As illustrated in FIG. 3, additive noise in a broadband powerline communication channel can be divided into five classes:

Colored background noise: This type of noise has a relatively low power spectral density, which varies with frequency. It is mainly caused by summation of numerous noise sources with low power.

Narrowband noise: This type of noise is mostly constituted by sinusoidal signals with modulated amplitudes. It is caused by ingress of broadcast stations in the medium and SW broadcast bands. The received level is generally varying with daytime.

Periodic impulsive noise (asynchronous to the mains frequency): These impulses have in most cases a repetition rate between 50 kHz and 200 kHz, which results in a discrete spectrum with a frequency spacing according to the repetition rate. This type of noise is mostly caused by switching power supplies.

Periodic impulsive noise (synchronous to the mains frequency): These impulses have a repetition rate of 50 Hz or 100 Hz and are synchronous to the mains cycle. They are of short duration (some microseconds) and have a power spectral density decreasing with frequency. This type of noise is caused by power supplies operating synchronously with the mains cycle.

Asynchronous impulsive noise: This type of noise is caused by switching transients in the network. The impulses have a duration of some microseconds up to a few milliseconds with random arrival interval. The power spectral density of this type of noise can reach values of more than 50 dB above the background noise.

Note that the present inventions particularly, but not exclusively, targets at the problems occuring in connection with the narrowband noise.

While the first three noise types usually remain stationary for seconds or minutes and may therefore be summarized as background noise, the last two noise types are time-variant in terms of microseconds or milliseconds. During the occurrence of such impulsive noise the power spectral density is perceptibly higher and may cause bit or burst errors in data transmission.

One technique for data transmission over power lines is Orthogonal Frequency Division Multiplexing (OFDM). The basic idea of OFDM is to divide the available spectrum into several narrowband, low-data-rate subcarriers. In this respect, it is a type of Discrete Multi-Tone (DMT) modulation. Each narrow-band subcarrier can be modulated using various modulation formats. By choosing the subcarrier spacing $\Delta f$ to be small, the channel transfer function reduces to a simple constant within the bandwidth of each subcarrier. In this way, a frequency-selective channel is divided into several flat-fading subchannels, which eliminates the need for sophisticated equalizers. OFDM mitigates the effects of time-dispersion and minimizes the effect of in-band narrowband interference.

Moreover, it has a high bandwidth efficiency and is scalable to high data rates. OFDM is flexible, can be made adaptive and has an excellent inter-channel interference (ICI) performance, such that complex channel equalization is not required.

BRIEF DESCRIPTION OF THE STATE OF THE ART

WO 01/93449 A1 pertains to a PLC system which comprises the following elements in order to prevent malfunctions during the data exchange between different users, while maintaining a high transmission capacity: In addition to a number of working channels (so-called "chimneys"), which are responsible for data exchange between users wishing to communicate (cf. FIG. 4), a specially set up broadcast channel, which provides general access for users wishing to communicate, serves to establish or clear a connection between these users and synchronize communication with each other.

In U.S. Pat. No. 6,006,071, a wireless RF communication system operating in the presence of a repetitive interference source (e.g. a microwave oven) powered by an AC power line is disclosed. The system uses redundant transmission synchronized to the power line to ensure accurate reception by at least one device. The RF communication system includes a first device powered by an AC power line which also powers the repetitive RF interference source. The first device, in turn, preferably includes an RF transmitter for transmitting in a frequency band of the repetitive RF interference source, a powerline sensor, and a data transmit controller. The data transmit controller generates a plurality of data packets with each data packet including an error detection portion. The data transmit controller also operates the RF transmitter to generate repetitive first and second transmissions of the same data packet responsive to the powerline sensor. Accordingly, at least one of the two transmissions occurs during an OFF period of the repetitive RF interference source. The second device also preferably includes a data receive controller for receiving the repetitive first and second transmission of the same data packet and selecting one based upon the error detection portions thereof to avoid interference caused by the repetitive RF interference source.

PROBLEMS OF PRIOR-ART SOLUTIONS

Known PLC systems face a major problem in emitting electro-magnetic signals to the environment that disturb the reception of broadcast radio signals within the same frequency band. Typically, PLC operates in a frequency band up to f.e. 50 MHz or higher, and AM broadcasting uses a frequency band ranging from LW (150 kHz) over MW up to SW (150 kHz . . . 30 MHz). A conventional power cable which is used for conveying PLC signals emits through its non-shielded sections generates some noise that could potentially disturb the reception of AM and Digital Radio Mondiale (DRM) broadcast signals by wireless receivers located in the same area. Different types of appliances which are connected to a power supply network represent additional noise sources. Furthermore, restrictions imposed on the use of various frequency bands in the power line spectrum limit the achievable data rates.

In general, PLC systems emit so much noise on a wide frequency spectrum that receiving SW radio is limited within an area close to the PLC modem. There are concerns that electro-magnetic emissions generated by PLC systems might result in a significant quality degradation of wireless services.

OBJECT OF THE PRESENT INVENTION

In view of problems encountered with the prior art, it is the object of the invention to propose a techniqur for detecting potential interferences between a PLC system and broadcast signals radiated in the same frequency bands.

This object is achieved by means of the features of the independent claims. Advantageous features are defined in the subordinate ordinate claims. Further objects and advantages of the invention are apparent in the detailed description which follows.

SUMMARY OF THE INVENTION

The invention is basically dedicated to a method for defining useable frequency bands for a powerline communication (PLC) system in such a way that electromagnetic emissions generated by PLC signals that are transmitted via said power supply lines do not interfere with broadcast RF signals radiated in the same frequency bands. For this purpose, PLC nodes participating in a PLC session scan the entire frequency range designated for powerline communication to detect frequency bands which are occupied by broadcast services.

Additionally or alternatively, during powerline communication the occurrence of broadcast RF signals can be regularly checked by screening the entire frequency range designated for powerline communication and detecting relevant broadcast bands that should be omitted during powerline communication to avoid interference noise. Thereafter, new frequency bands for powerline communication eventually can be allocated within said frequency range, provided that these new bands are not occupied by any detected wireless service.

Broadcast RF signals which can be received by a wireless RF receiver in the environment of the PLC system can automatically be detected by the PLC system without needing any communication link between the wireless RF receiver and the PLC system. With this technology, the entire frequency range which is needed for powerline communication can be screened without interrupting running powerline communication sessions.

BRIEF DESCRIPTION OF THE DRAWINGS

Further advantages and conceivable applications of the present invention result from the subordinate claims as well as from the following description of the embodiments of the invention as depicted in the following drawings:

FIG. 2b is a block diagram showing an example for the lastmeter network conditioning of the powerline communication network, FIG. 5 is a diagram showing the time schedule of a procedure for detecting and monitoring broadcast signals in the environment of a powerline communication system according to the present invention, FIG. 6a is a diagram showing a number of temporal gaps inserted into the time framing of a time-division multiplex (TDM)-based transmission system used for transmitting data packets via a powerline communication network, said gaps representing those time slots which should be omitted during powerline communication to avoid interference noise, and FIG. 6b is a diagram showing a spectral gap inserted into the frequency range of a frequency-division multiplex (FDM)-based transmission system used for transmitting data packets via a powerline communication network, said gap representing a subchannel which should be omitted during powerline communication to avoid interference noise.

DETAILED DESCRIPTION OF THE PRESENT INVENTION

Figure 1:
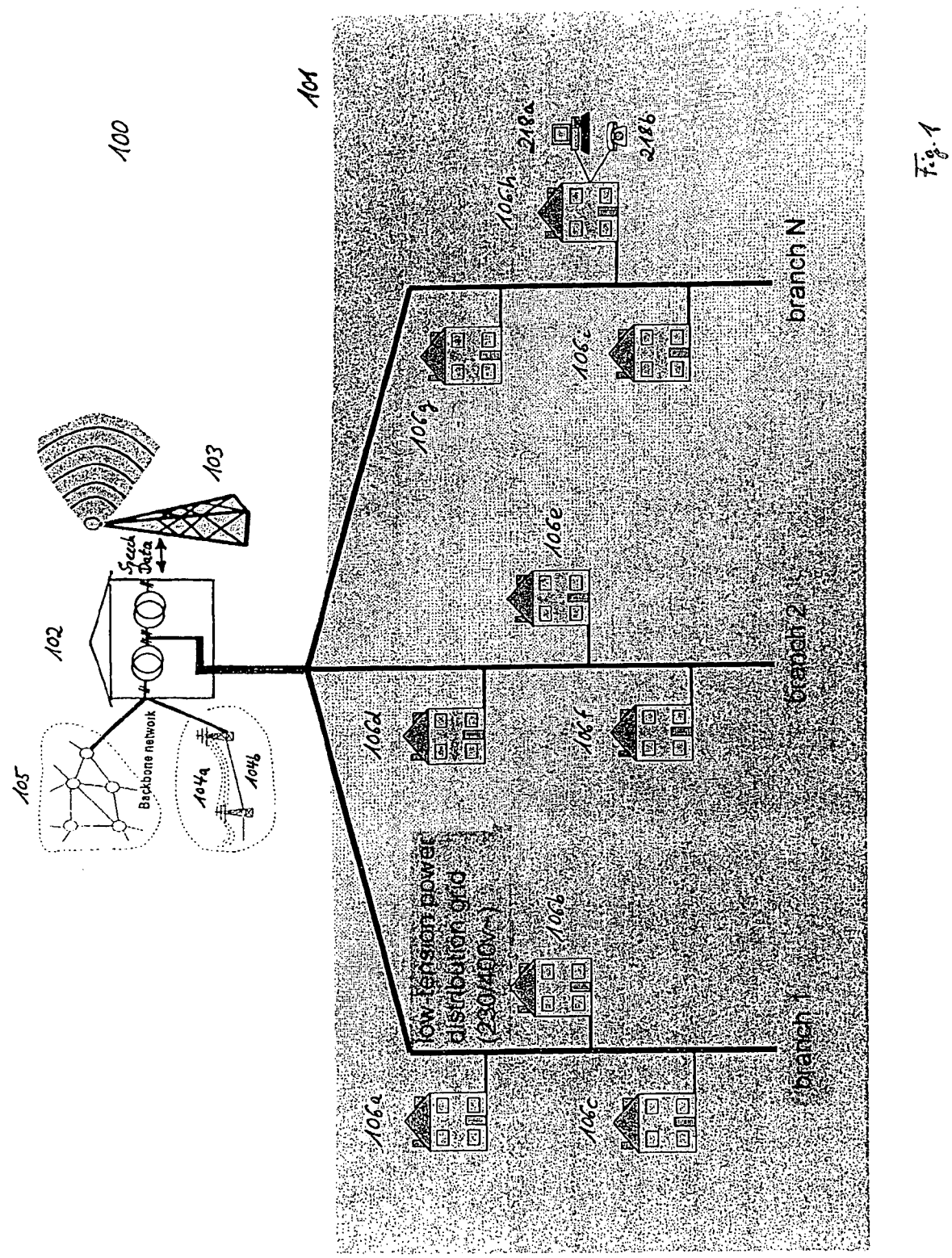
FIG. 1 shows an example of a typical powerline communication environment.
Figure 2A:
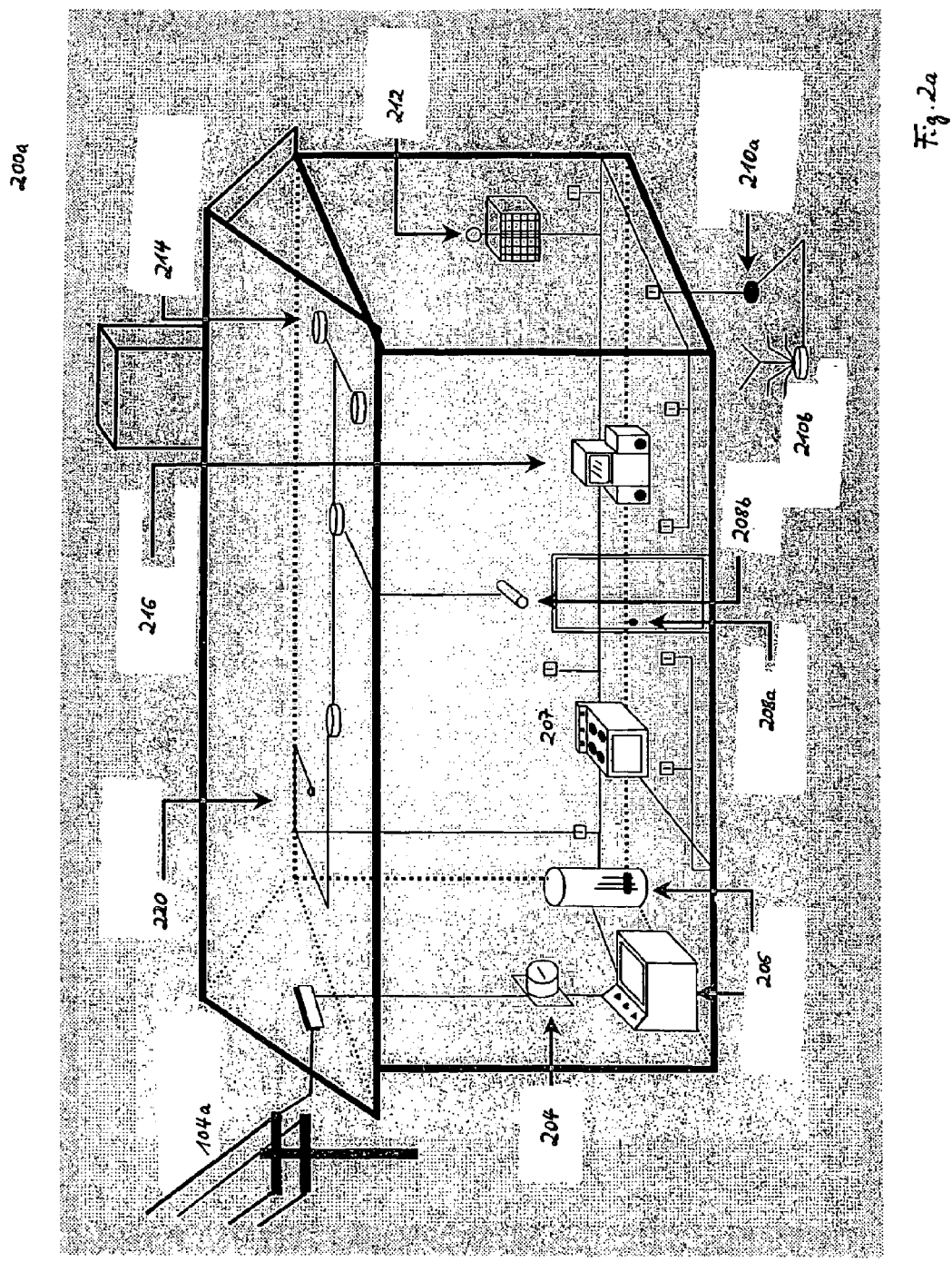
FIG. 2a shows an example of a heterogeneous home networking system installed within a building interconnecting a number of different office, household, home entertainment, multimedia and/or communication devices used within said building.
Figure 2B:
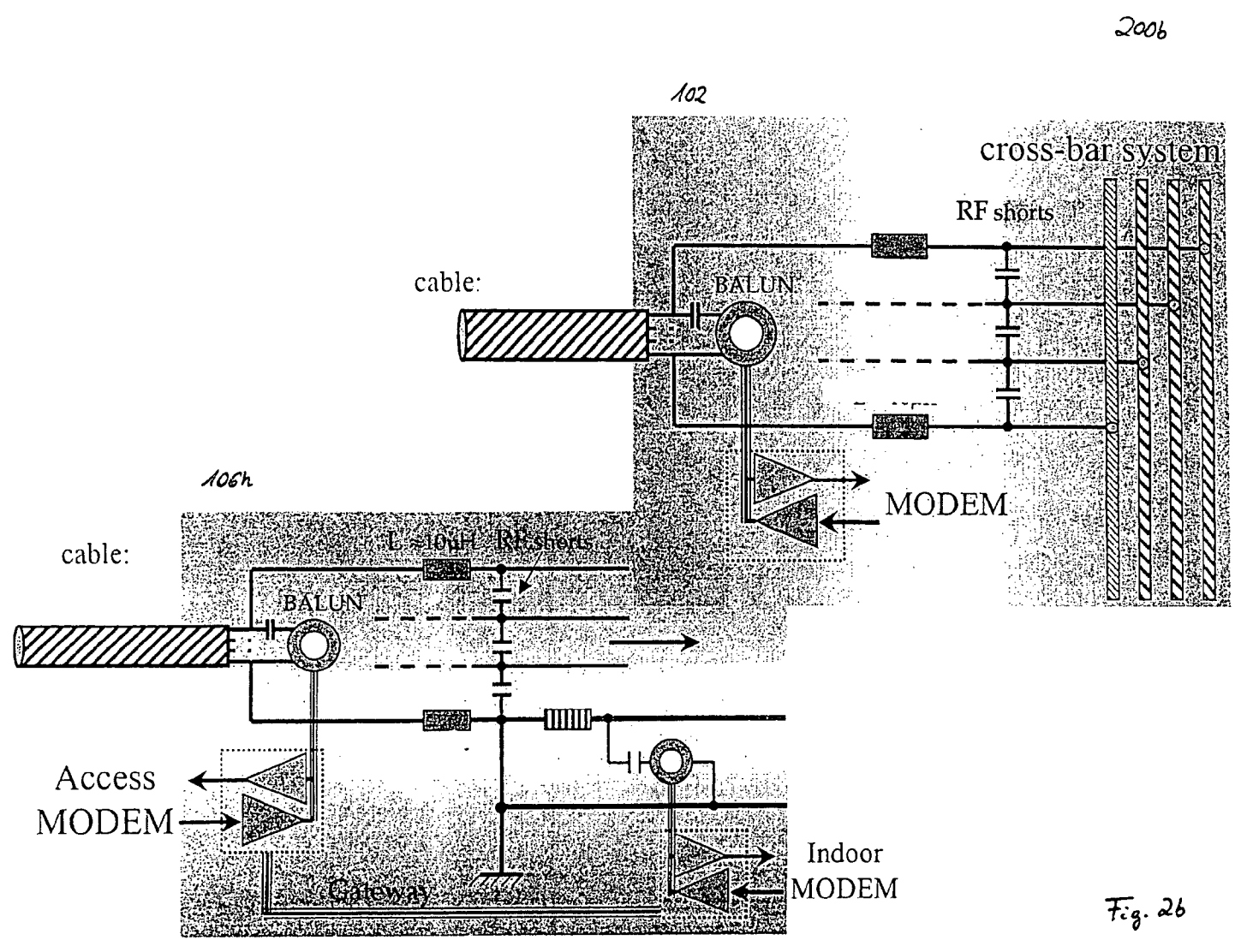
Figure 3:
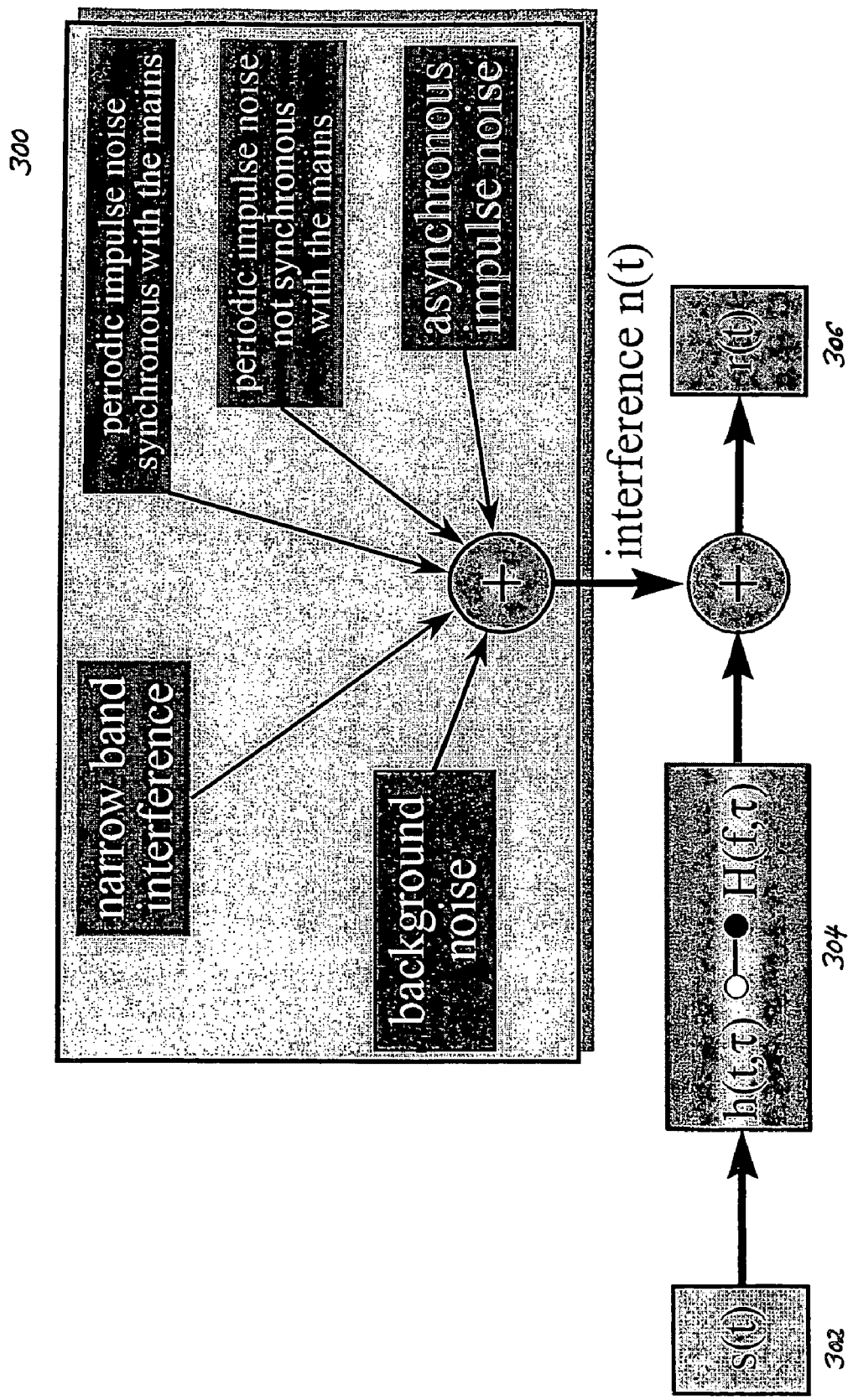
FIG. 3 illustrates the interference scenario in the environment of a typical powerline communication network.
Figure 4:
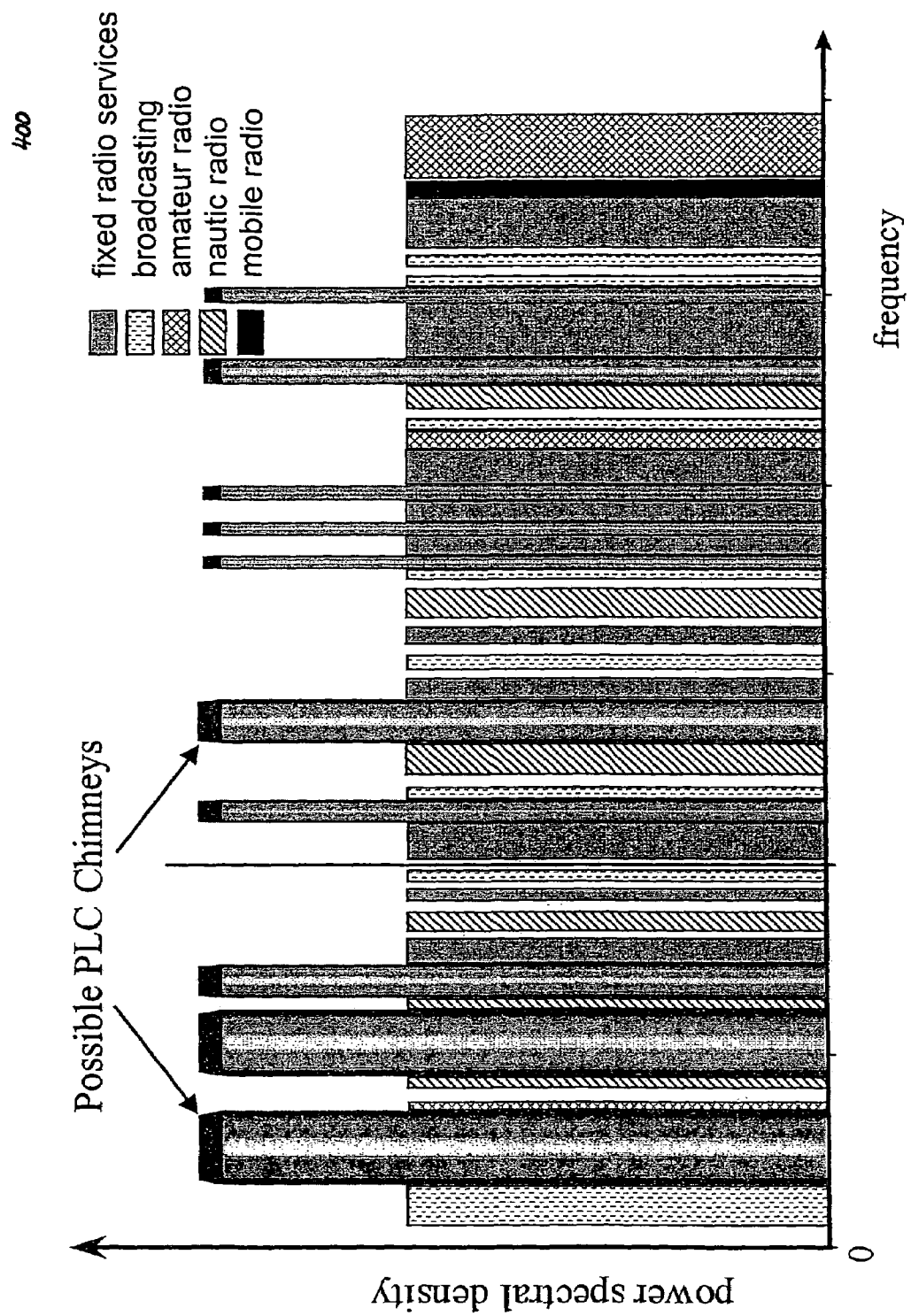
FIG. 4 is a diagram showing the spectral gaps between a number of possible working channels (PLC chimneys), which are responsible for data exchange between different users wishing to communicate via a powerline communication network.

In the following, one embodiment of the present invention as depicted in FIGS. 5 to 6b shall be explained in detail. The meaning of the symbols designated with reference numerals and signs in FIGS. 1 to 6b can be taken from an annexed table.

According to one embodiment of the present invention, every node 302, 306 participating in a powerline communication session uses its receiving device and the PLC cable as a detector for checking/listening whether there are receivable broadcast signals in the environment of the respective node (302 or 306) that should not be interfered by electromagnetic emissions generated by PLC signals (s(t)) transmitted via power supply lines of the PLC system 101 and which frequency bands have to be omitted during powerline communication. As depicted in FIG. 5, the detection of existing broadcast signals can be optionally or additonally performed in two phases:

1. Initial scan: An initial scan of the entire applicable frequency band is used to detect existing wireless services before starting own PLC activities. Initial knowledge of the load of the available frequency resource offers the advantage to avoid disturbance of existing wireless services from the very beginning: If the PLC system 101 knows already existing services from its initial scan, it can exclude the related frequency bands. Thus, negative influence of the PLC system 101 on running wireless services will never occur.
2. In-service monitoring: In order to check the occurrence of broadcast signals during normal operation of the PLC system 101, a PLC signal (frequency and/or time) structure can be defined in such a way that there is a gap 602a/b in the time framing (cf. FIG. 6a) or the frequency band (cf. FIG. 6b) during which the PLC nodes 302 and 306 can screen ("listen") for occupied broadcast bands that should be omitted during powerline communication to avoid any type of interference noise n(t). F.e. in TDMA, systems ("silent") time slot gaps can already exist for other purposes, such that using these time gaps will not decrease the overall performance of the PLC system. Particularly frequency gaps can be introduced for the screening/listening purpose only. The detected information from every node is taken into account for defining the next frequency allocation step of the PLC system 101. As PLC transmission is usually synchronous, the gap 602a could also be synchronous, which means that there is really a short period of time where there is silence for screening the transmission band. Depending on the sensitivity of the applied broadcast receivers, the procedure of screening the broadcast transmission bands during said gap 602a/b, which is performed by the PLC system 101, should be done either by employing a low-cost solution using the receiving devices of the PLC system 101 or special receiving devices. Thereby, seamless reconfiguration of the entire PLC system 101 is needed. Moreover, allocating new frequency bands should be possible without interrupting the data transmission of the PLC system 101. On the assumption that there are more than one active PLC systems, these systems are synchronized as long as they recognize each other.

According to one embodiment of the invention, transmission of PLC signals s(t) to be conveyed via power supply lines of said power supply network 104a is based on a time-division multiplexing (TDM) technique, and the TDM transmission channel is split up into frames consisting of a predefined number of cyclically repeated time slots that are used for conveying different control and traffic channels, respectively, to simultaneously transmit multiple data streams. Thereby temporal gaps 602a can be provided or inserted (S4a), which gaps not being used for PLC data transmission are used for the screening/listening procedure.

According to a further embodiment of the invention, transmission of PLC signals s(t) to be conveyed via power supply lines of said power supply network 104a is based on a frequency-division multiplexing (FDM) technique, and the FDM transmission channel is split up into a predefined number of subchannels used for simultaneously transmitting multiple data streams. Thereby, at least one spectral gap 602b can be reserved for the screening/listening procedure.

PLC modems typically apply multi-carrier modulation techniques such as Orthogonal Frequency-Division Multiplexing (OFDM). For example, if OFDM modulation with a 4,096-point Inverse Fast Fourier Transform (IFFT) is applied, 4,096 equally spaced subchannels with a carrier spacing of 7.3 kHz are obtained for a 30-MHz frequency band. To make the frequency band free of interference, i.e. for a DRM or AM radio signal, two or three carriers have to be switched off. Likewise, searching for any other services which may use a particular carrier frequency has to be done when the subchannel located at this carrier frequency is switched off. A signal which is transmitted via this subchannel is then conveyed on another subcarrier.

As the sensitivity of a powerline antenna is adequate for detecting AM/DRM signals with low field strength levels, a gap 602a/b in time framing or in the frequency band of a PLC signal to be transmitted helps to detect receivable broadcast signals either by using the PLC system 101 itself or a specific receiving device. For enhancing the detection mechanism special correlation methods can additionally be used. On the assumption that up to 100 broadcast programs can be received in a normal household, there is enough space left for powerline communication since these broadcast programs only occupy between 1 and 2 MHz of the 25-MHz band used for PLC communication.

TABLE

Depicted Features and their Corresponding Reference Signs

| No. | Technical Feature (System Component or Procedure Step) |
|---|---|
| 100 | example of a typical powerline communication environment |
| 101 | powerline communication network, used as an in-home network for home automation and supporting multimedia applications |
| 102 | transformer station of the powerline communication network 101 |
| 103 | base station of a mobile network, connected to the powerline communication network via said transformer station 102 |
| 104a | high-/medium-voltage power supply network, connected to the powerline communication network via said transformer station 102 |
| 104b | fiber-optic network, connected to the powerline communication network via said transformer station 102 |
| 105 | fixed telecommunication network connected to the powerline communication network via said transformer station 102 |
| 106a–h | networked buildings, connected to the powerline communication network 101 |
| 200a | example of a heterogeneous home networking system installed within a building 106h interconnecting a number of different office, household, home entertainment, multimedia and/or communication devices used within said building 106h |
| 200b | block diagram showing an example for the last-meter network conditioning of the powerline communication network 101 |

TABLE-continued

Depicted Features and their Corresponding Reference Signs

| No. | Technical Feature (System Component or Procedure Step) |
|---|---|
| 204 | power meter measuring the power consumption of these interconnected devices |
| 206 | energy supply systems, installed within the networked building 106h |
| 207 | stove and oven, installed within the kitchen of the networked building 106h |
| 208a | electronic door locking system of the networked building 106h |
| 208b | burglar alarm system for safety monitoring, installed above the entrance door of the networked building 106h |
| 210a | temperature-humidity measuring and control device |
| 210b | lawn sprinkler system, controlled by said temperature-humidity control device 210a |
| 212 | central air conditioning system of the networked building 106h |
| 214 | programmable illumination system of the networked building 106h |
| 216 | home entertainment devices (television set, video recorder or DVD player, Hi-Fi stereo system) |
| 218a | PC with network card for Internet access, installed within the networked building 106h |
| 218b | fixed telephone, installed within the networked building 106h |
| 220 | fire and/or smoke sensors, installed within the networked building 106h |
| 300 | diagram showing an overview of the interference scenario in the environment of a typical powerline communication network 101 |
| 302 | first transmitting device, connected to a first receiving device 306 via a powerline communication network 101, which transmits the signal s(t) |
| 302' | second transmitting device, connected to a second receiving device 306' via the powerline communication network 101, which transmits the signal s'(t) |
| 304 | powerline communication channel interconnecting said transmitting device 302 and said receiving device 306, whose channel impulse response h(t, τ), which is given by the Inverse Fourier Transform (IFFT) of its channel transfer function H(f, τ), is severely distorted by different types of interference noise n(t) |
| 306 | first receiving device, connected to the first transmitting device 302 via said powerline communication network 101, which receives the signal r(t) = s(t) + n(t) |
| 306' | second receiving device, connected to the second transmitting device 302' via said powerline communication network 101, which receives the signal r'(t) = s'(t) + n'(t) |
| 400 | diagram showing the spectral gaps between a number of possible working channels (so-called "PLC chimneys"), that are responsible for data exchange between different users wishing to communicate via a powerline communication network 101 |
| 500 | diagram showing the time schedule of a procedure for detecting and monitoring broadcast signals in the environment of a powerline communication system 101 according to the present invention |
| 502 | initial scan phase of said procedure 500, performed by a mobile node participating in a PLC session, for scanning (S1a) the frequency range designated for powerline communication and detecting (S1b) existing RF services before starting own communication activities |
| 504 | in-service monitoring phase of said procedure 500 for checking (S2) the occurrence of broadcast signals during normal operation of the PLC system 101, wherein a PLC signal is defined in such a way that there is a gap in the time framing (cf. FIG. 6a) or the frequency band (cf. FIG. 6b) during which nodes participating in a PLC session screen (S2a) the entire frequency band and detect (S2b) relevant broadcast bands that have to be omitted during powerline communication to avoid interference noise n(t) |
| 600a | diagram showing a number of temporal gaps 602a inserted into the time framing of a time-division multiplex (TDM)-based transmission system for transmitting data packets via a PLC network 101, said gaps representing those time slots which should be omitted during powerline communication |
| 600b | diagram showing a spectral gap 602b inserted into the frequency range of a frequency-division multiplex (FDM)-based transmission system for transmitting data packets via a PLC network 101, said gap representing a subchannel which should be omitted during powerline communication |
| 602a | temporal gaps in the time framing of a typical PLC system 101 based on time-division multiplex (TDM) |
| 602b | spectral gaps in the frequency range of a typical PLC system 101 based on frequency-division multiplex (FDM) |
| S1a | step #1a: scanning the entire frequency range designated for powerline communication |
| S1b | step #1b: detecting frequency bands occupied by existing wireless services before starting own powerline communication activities |
| S2 | step #2: regularly checking the occurrence of broadcast signals during powerline communication |
| S2a | step #2a: screening the entire frequency range designated for powerline communication |
| S2b | step #2b: detecting relevant broadcast bands that have to be omitted during powerline communication to avoid interference noise n(t) |
| S3 | step #3: allocating new frequency bands for powerline communication within said frequency range, provided that these new frequency bands are not occupied by any detected wireless service |
| S4a | step #4a: inserting cyclically repeated temporal gaps 602a into the time framing of a time-division multiplex (TDM) based PLC transmission channel providing a predefined number of cyclically repeated time slots for conveying different control and traffic channels, respectively, to simultaneously transmit multiple data streams, said gaps 602a representing those time slots which should be omitted during powerline communication |

TABLE-continued

Depicted Features and their Corresponding Reference Signs

| No. | Technical Feature (System Component or Procedure Step) |
|---|---|
| S4b | step #4b: inserting a number of spectral gaps 602b into the frequency range of a frequency-division multiplex (FDM)-based PLC transmission channel providing a predefined number of subchannels for conveying different control and traffic channels, respectively, to simultaneously transmit multiple data streams, said gaps 602b representing those subchannels that should be omitted during powerline communication |
| S5 | step #5: on the assumption that there are more than one active PLC systems, synchronizing these systems as long as they recognize each other |

The invention claimed is:

1. A communication method using a powerline communication system, which uses power supply lines of a power supply network as signal transmission lines for interconnecting a number of PLC nodes, characterized in that at least one PLC node participating in a powerline communication session performs the following step:

scanning the frequency range designated for powerline communication and detecting frequency bands occupied by existing wireless services before starting own powerline communication activities.

2. A communication method using a powerline communication system, which uses power supply lines of a power supply network as signal transmission lines for interconnecting a number of PLC nodes, characterized in that at least one PLC node participating in a powerline communication session performs the following step:

in a silent time and/or frequency gap of the PLC transmission, periodically screening for broadcast signals during powerline communication for detecting relevant broadcast bands that should be omitted during powerline communication to avoid interference noise.

3. A communication method according to claim 1, characterized by the step of:

allocating new frequency bands for powerline communication within said frequency range, provided that these new frequency bands are not occupied by any detected wireless service.

4. A communication method according to claim 1, wherein the transmission of PLC signals is based on a time-division multiplexing (TDM) technique and the TDM transmission channel is split up into frames consisting of a predefined number of cyclically repeated time slots used for conveying different control and traffic channels, respectively, to simultaneously transmit multiple data streams, wherein temporal gaps in the time framing of the transmission channel are reserved for the screening step.

5. A method according to claim 1, wherein the transmission of PLC signals is based on a frequency-division multiplexing (FDM) technique and the FDM transmission channel is split up into a predefined number of subchannels, wherein at least one spectral gap in the frequency range of the transmission channel used for powerline communication is reserved for the screening step.

6. A method according to claim 1, wherein at least two PLC sessions between a first PLC transmitter and a first PLC receiver and between a second PLC transmitter and a second PLC receiver interconnected via power supply lines of said power supply network are simultaneously active, characterized by the step of synchronizing data transmission of these two PLC sessions as long as said second PLC session can be recognized by said first PLC transmitter and/or said first PLC receiver and said first PLC session can be recognized by said second PLC transmitter and/or said second PLC receiver.

7. A powerline communication system for interconnecting a number of PLC nodes, said PLC nodes being designed to perform a method according to claim 1.

8. Using a PLC receiving part of a PLC node for screening for occupied RF broadcast bands in a silent frequency and/or time gap of the PLC signal structure.

9. A communication method according to claim 2, characterized by the step of:

allocating new frequency bands for powerline communication within said frequency range, provided that these new frequency bands are not occupied by any detected wireless service.

10. A communication method according to claim 2, wherein the transmission of PLC signals is based on a time-division multiplexing (TDM) technique and the TDM transmission channel is split up into frames consisting of a predefined number of cyclically repeated time slots used for conveying different control and traffic channels, respectively, to simultaneously transmit multiple data streams, wherein temporal gaps in the time framing of the transmission channel are reserved for the screening step.

11. A method according to claim 2, wherein the transmission of PLC signals is based on a frequency-division multiplexing (FDM) technique and the FDM transmission channel is split up into a predefined number of subchannels, wherein at least one spectral gap in the frequency range of the transmission channel used for powerline communication is reserved for the screening step.

12. A method according to claim 2, wherein at least two PLC sessions between a first PLC transmitter and a first PLC receiver and between a second PLC transmitter and a second PLC receiver interconnected via power supply lines of said power supply network are simultaneously active, characterized by the step of synchronizing data transmission of these two PLC sessions as long as said second PLC session can be recognized by said first PLC transmitter and/or said first PLC receiver and said first PLC session can be recognized by said second PLC transmitter and/or said second PLC receiver.

13. A powerline communication system for interconnecting a number of PLC nodes, serial PLC nodes being designed to perform a method according to claim 2.

14. A communication method using a powerline communication system, which uses power supply lines of a power supply network as signal transmission lines for interconnecting a number of PLC nodes, wherein at least one PLC node participating in a powerline communication session performs the following steps:

before starting own powerline communication activities, scanning the entire frequency range designated for powerline communication and detecting frequency bands occupied by existing wireless services for detecting interferences between said powerline communication system and said existing wireless services, and omitting said occupied frequency bands during said powerline communication.

* * * * *